Aug. 21, 1945.　　　P. G. GILBERT　　　2,382,989
ATTACHMENT FOR HAND TRUCKS
Filed July 3, 1944　　　2 Sheets-Sheet 1

INVENTOR
PHILO G. GILBERT
BY C. B. Birkenbeuel
ATTORNEY

Aug. 21, 1945.   P. G. GILBERT   2,382,989
ATTACHMENT FOR HAND TRUCKS
Filed July 3, 1944   2 Sheets-Sheet 2
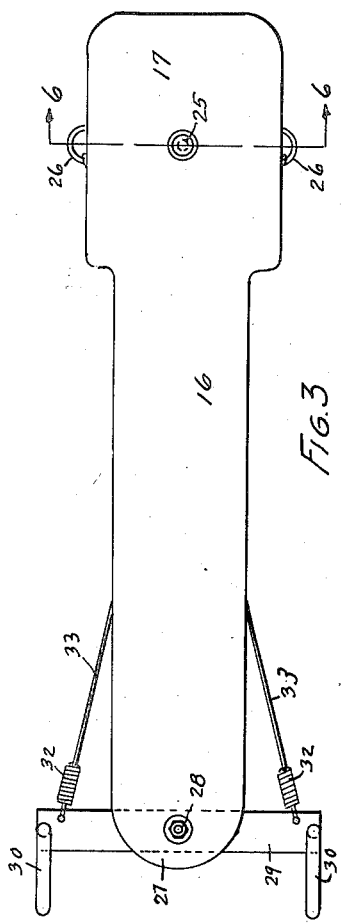
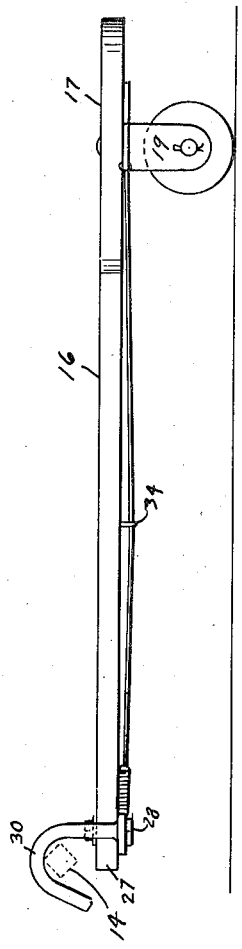
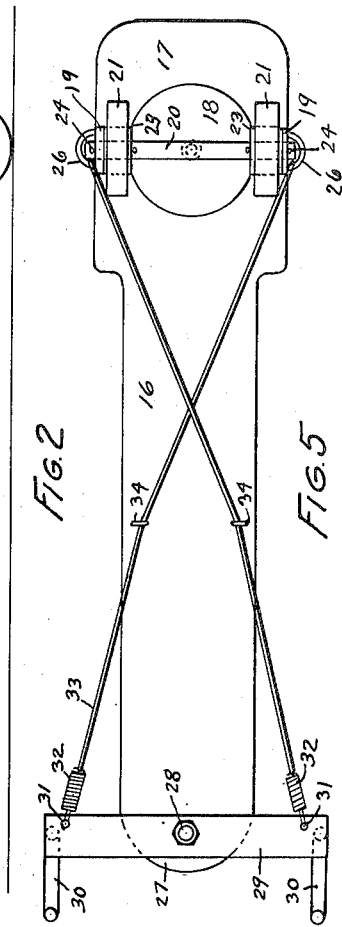
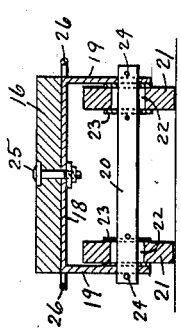
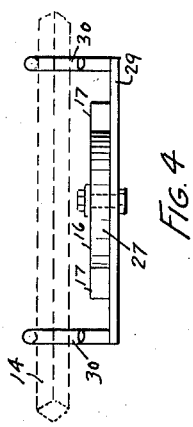
INVENTOR
PHILO G. GILBERT.
By E. B. Birkenbeul.
ATTORNEY.

Patented Aug. 21, 1945

2,382,989

UNITED STATES PATENT OFFICE 2,382,989

ATTACHMENT FOR HAND TRUCKS

Philo G. Gilbert, Portland, Oreg.

Application July 3, 1944, Serial No. 543,268

4 Claims. (Cl. 280—87.04)

This invention relates generally to hand trucking and particularly to an attachment for hand trucks.

The main object of this invention is to provide an attachment of the class described whereby there is produced a substantial saving in time and labor in hand trucking operations.

The second object is to minimize the amount of physical exertion required in hand trucking and to greatly reduce the amount of walking required in such operations.

The third object is to so construct the device that the operator can ride along with the empty or loaded truck, and at all times hold the load in a perfect state of balance.

The fourth object is to so construct the device that it is extraordinarily maneuverable and so that it can be attached to the truck by merely dropping its hooked end over the axle of the truck.

The fifth object is to so construct the device that it may easily be disconnected from the truck by bearing down upon the device behind its rearmost supporting wheels.

The sixth object is to so construct the device that no matter in which direction the truck itself is turned, the trailing end of the device will be steered in the opposite direction in order to keep the weight of the driver directly behind the truck.

I accomplish these and other objects in a manner set forth in the following specification as illustrated in the accompanying drawings, in which Fig. 1 is a perspective view of the device showing its relation to an operator and truck.

Fig. 2 is a side elevation of the device.

Fig. 3 is a plan of Fig. 2.

Fig. 4 is an end elevation of Fig. 2.

Fig. 5 is a bottom view of Fig. 2.

Fig. 6 is a transverse section taken along the line 6—6 in Fig. 3.

Similar numerals refer to similar parts throughout the several views.

Figure 1:
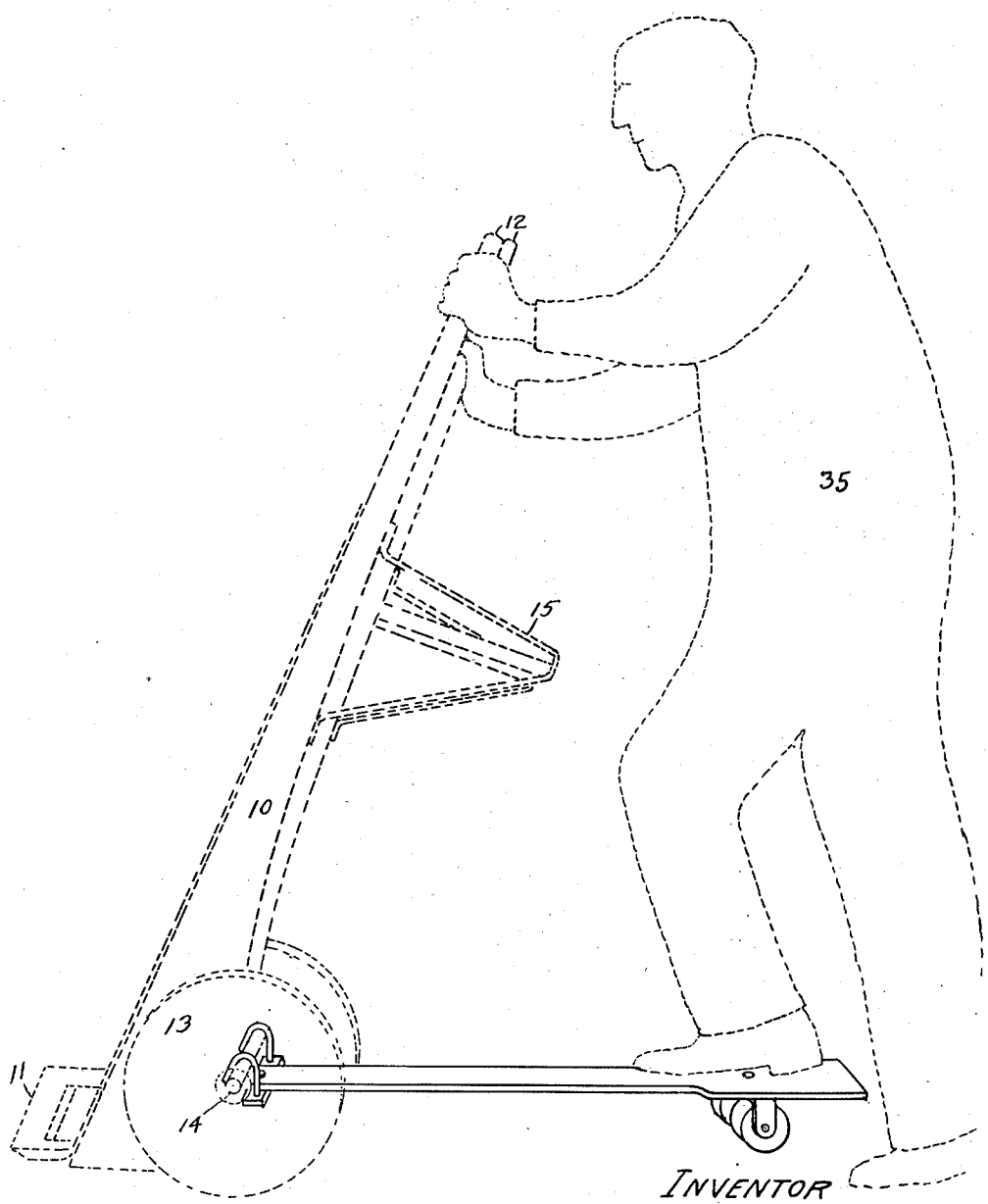

Referring in detail to the drawings, there is shown a common form of hand truck 10, having the load supporting nose 11 at one end and handles 12 at the other end thereof. The usual truck wheels 13 support the truck 10 on the axle 14, which may be square or round or any other shape. The usual legs 15 are also illustrated.

Referring in detail to the invention, it will be seen to consist of a horizontal running board 16, whose rearmost end 17 is preferably widened as illustrated, and has attached to the under side thereof a circular plate 18 having outwardly and downwardly turned standards 19 which support the axle 20, on which are disposed the wheels 21, preferably separated from the axle 20 by the anti-friction rollers 22. Washers 23 on each side of the wheels 21 serve as retainers for the rollers 22. Cotter pins 24 serve to hold the parts in position. The circular plate 18 is rotatably mounted on the bolt 25, which extends through the running board's end 17. At each end of the members 19 is mounted a curved guard 26.

At the forward end 27 of the running board 16 is mounted the bolt 28, to which is pivotly attached a bar 29, which is on the under side of the running board 16. The bar 29 has mounted at each end a backwardly and downwardly curved hook 30, by means of which the device is capable of being attached to the shaft 14, as shown in Fig. 1. The bar 29 is provided with holes 31 near the outermost rearward edge thereof. Through the openings are placed the ends of the tension springs 32, to which are attached the crossed cables 33, which pass through the screw eyes 34 on the under side of the running board 16 and are attached to the opposite guards 26. The cables 33 are adjusted to maintain some tension on the springs 32.

The purpose of this construction can clearly be seen by an inspection of Fig. 1. If, for example the operator 35 turns the truck wheels 13 to the right, the wheels 21 are turned to the left tending to place the weight of the driver directly behind the truck as quickly as possible, making the device very maneuverable.

While I have thus illustrated and described my invention, it is not my desire to be limited to the precise form shown herein, and I intend to cover such forms and modifications of the invention as fall fairly within the appended claims.

I claim:

1. The combination of a hand truck with a running board pivotly attached to the hand truck and having steerable wheels supporting the rearward end of said running board, together with means for steering said wheels oppositely to the wheels of the truck.

2. In a device of the class described, the combination of a running board having means for pivotly attaching the forward end thereof to the axle of the truck, caster wheels for supporting the rearward end of said running board, and means for steering said caster wheels in a manner to maintain the rearmost end of the running board directly behind said truck.

3. In a device of the class described, the combination of an elongated bar having means for supporting said bar below the axle of a hand truck, a running board pivotly attached to said bar, a pair of steerable wheels under the rearmost end of said running board, and crossed cables between said bar and said wheels whereby a given direction of the truck will produce a reverse direction of steering at the wheels under the rearmost portion of the running board.

4. A device of the class described, consisting of the combination of a manually propelled two-wheel truck and having a running board hingedly attached to the axle of said truck in a manner to permit said axle to turn to the right or left, a circular plate pivotly mounted on the under side of the rearmost end of said truck, said plate having down turned standards formed thereon, an axle mounted across said standards, wheels mounted on said axle, a pair of crossed cables disposed on the under side of said running board attaching the ends of said bar to diagonally opposite standards whereby the turning of said bar in one direction will cause said axle to turn in the opposite direction.

PHILO G. GILBERT.